March 19, 1963 L. E. PUGSLEY 3,081,865
OUTING KIT
Filed Sept. 30, 1960 4 Sheets-Sheet 1
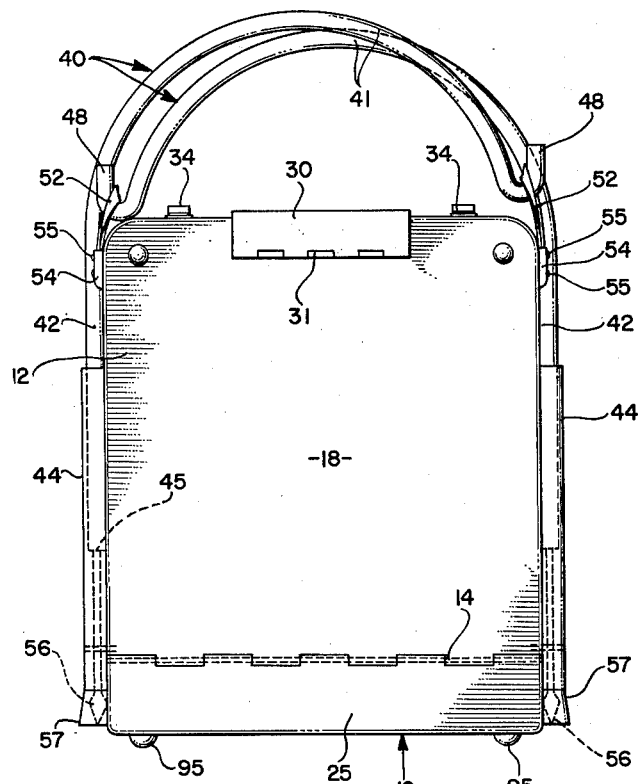
FIG. 1.
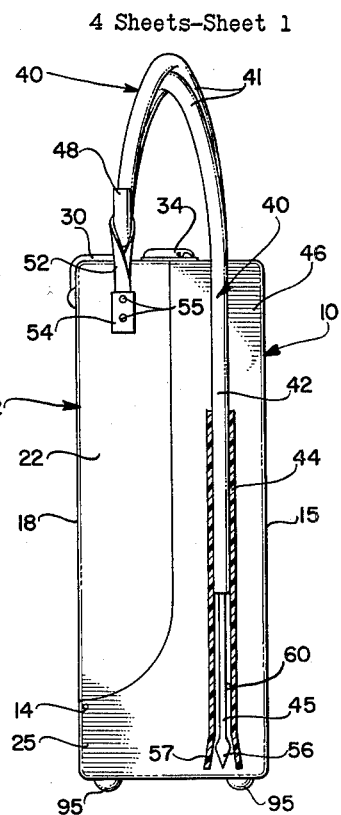
FIG. 2.
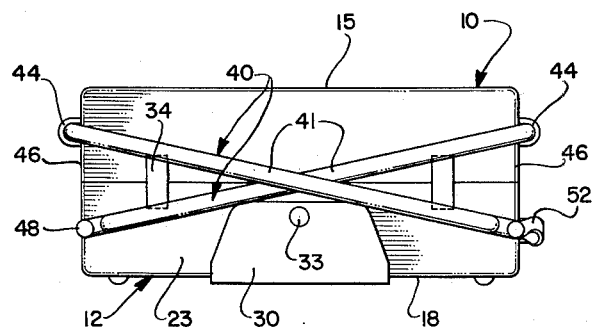
FIG. 3.
INVENTOR.
LAWRENCE E. PUGSLEY
ATTORNEY

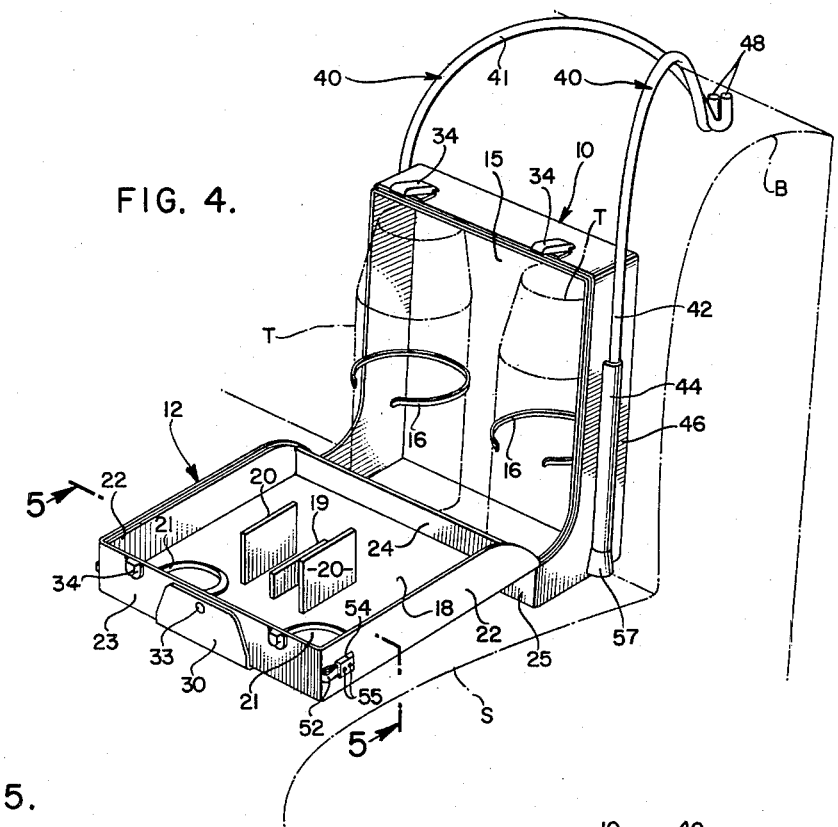
FIG. 4.
FIG. 5.
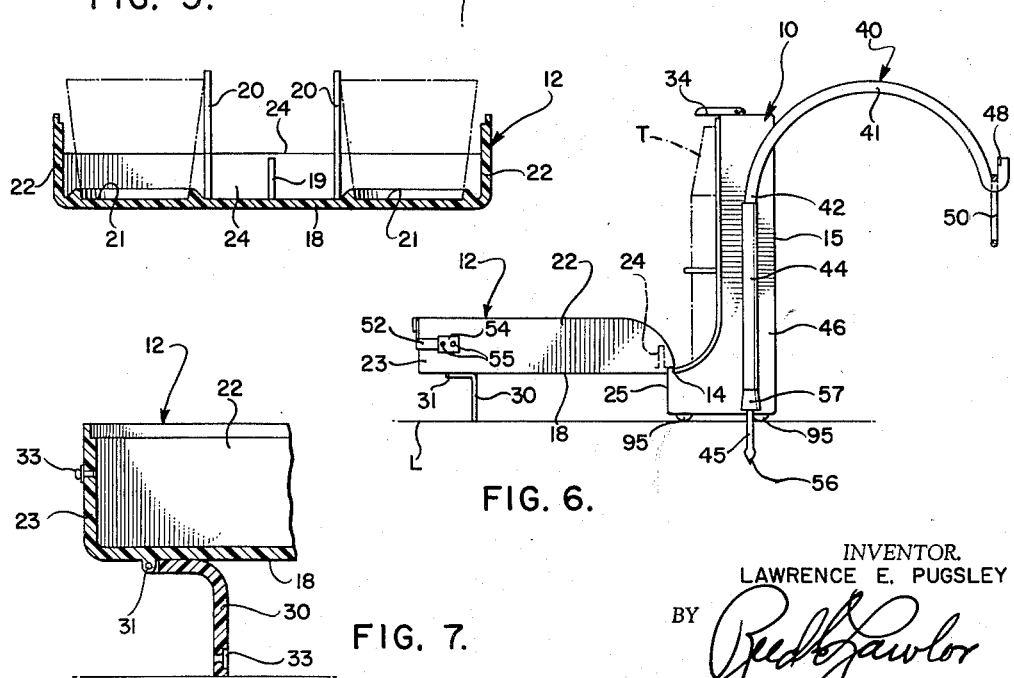
FIG. 6.
FIG. 7.
INVENTOR.
LAWRENCE E. PUGSLEY
BY
ATTORNEY March 19, 1963   L. E. PUGSLEY   3,081,865
OUTING KIT
Filed Sept. 30, 1960   4 Sheets-Sheet 3
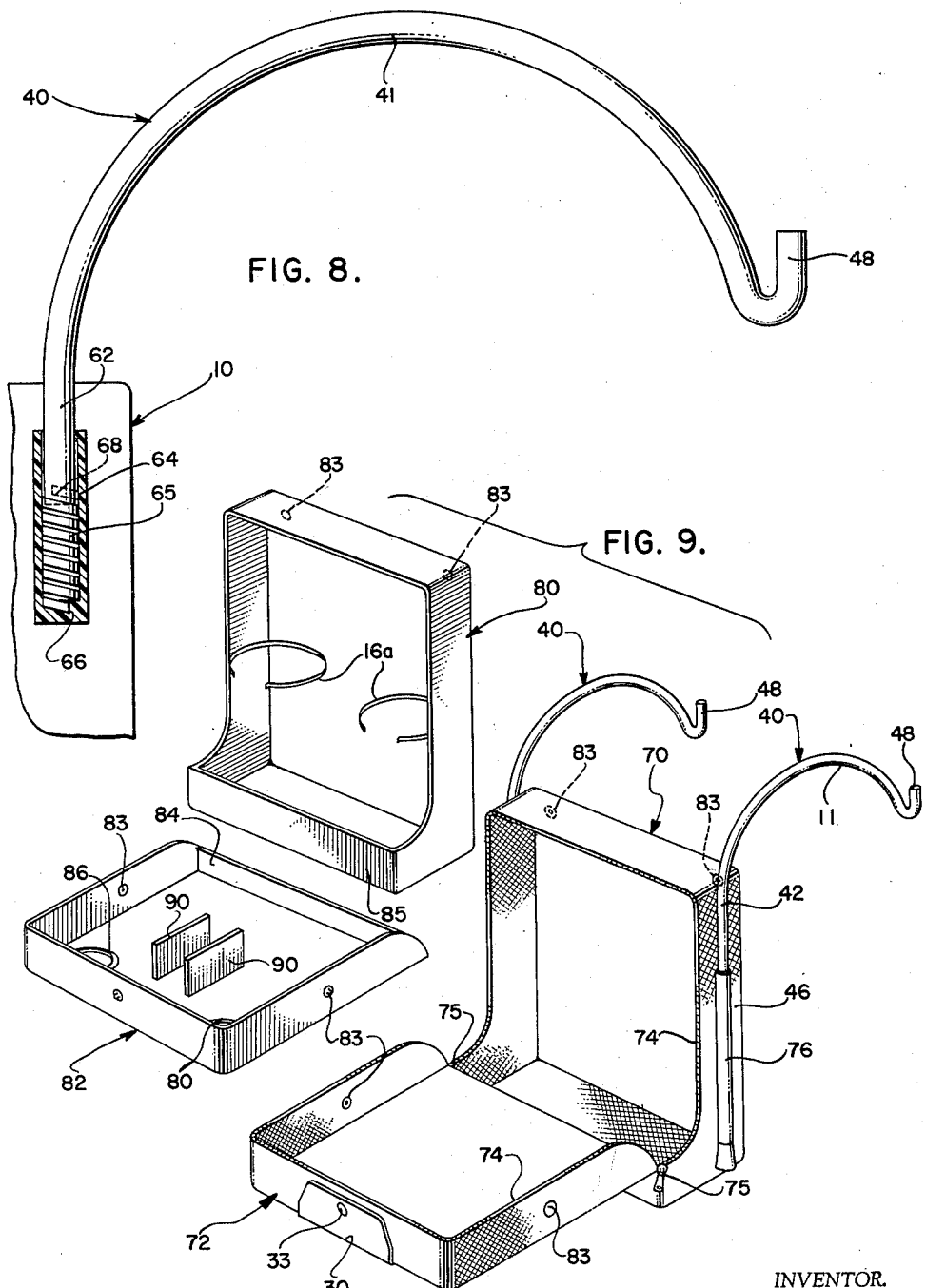

March 19, 1963

L. E. PUGSLEY 3,081,865

OUTING KIT

Filed Sept. 30, 1960

INVENTOR.
LAWRENCE E. PUGSLEY

BY

ATTORNEY.

United States Patent Office 3,081,865
Patented Mar. 19, 1963

3,081,865
OUTING KIT
Lawrence E. Pugsley, Rte. 1, Box 656, Escondido, Calif.
Filed Sept. 30, 1960, Ser. No. 59,672
5 Claims. (Cl. 206—4)

This invention relates to outing kits such as commonly used for camping, picnicking, and pack outfits, especially kits containing thermos bottles for the reception of beverages, for example, brewed coffee or tea.

It is currently common to provide shallow kits which contain one or more conventional thermos bottles in which milk, hot water, and brewed coffee are contained, such kits commonly also carrying an elongated lunch box. Such kits are adapted to stand vertically, and their tops often are closed with sliding fasteners conventionally known as zippers. In practice, such kits are not provided with any particular means to cause them to stand upright, nor are they adapted to be laid open to expose food or cups of liquid which may have been carried therein.

It is, therefore, a particular object of this invention to provide camping and picnicking kits adapted to contain thermos bottles and the like which may be positioned vertically so that the thermos bottles may stand vertically with their tops or stoppers removed. It is also an object of the invention to provide a kit of the indicated nature in which a lid member or tray member may be swung down into horizontal position to receive cups of beverage and food items such as sandwiches or the like without danger of the vertical or body portion of the kit falling over with its open thermos bottles containing beverages.

More specifically, an object of the invention is to provide a kit or pack of the described type having means for hanging it over the back of an automobile seat or the like, and including means for retaining such kit or pack in vertical position for picnicking or similar purposes. It is another object to provide positioning or supporting means of the stated nature which may also serve as handle means for carrying the kit or pack assembly when closed.

It is additionally an object of this invention to provide a kit means or pack assembly including a body member or case adapted to be disposed in vertical position to receive thermos bottles and the like, such body member being produced of substantially rigid material, such as any of the conventional molded plastics, or such body member containing a similar rigid insert. An additional object of the invention is to provide a lid or tray hinged to the lower portion of such body member or case, such lid or tray preferably also being of rigid plastic material of the indicated nature or containing an insert of similar material.

A further object of the invention is to provide elongated shank members at the sides of the body member, as considered when in vertical position, the upper portions of such shank members having laterally disposed hook-like portions to be engaged over the shoulders of a hiker or over the back seat of an automobile or the like.

A further object of the invention is to provide for mounting of such shank members and their hook-like members so that they may swing about vertical axes in suitable carrying positions on a seat back or a hiker's shoulders, and so that they may also swing to lie across the top of the kit or case and have the extremities thereof anchored to the kit or case whereby such hook-like members may serve as handle means for carrying the outfit.

A still further object of the invention is so to construct and position the shank means that they may slide vertically at the sides of the case body and may be caused to penetrate the earth to maintain the upright position of the kit when picnicking.

A still further object is to provide means at the extremities of said laterally extending hook-like portions so that the latter may be connected together to secure them properly upon the shoulders of the hiker or upon the back of a supporting seat.

Other objects of the invention and various features of construction thereof will become apparent to those skilled in this art upon reference to the accompanying drawings and the following specifications wherein certain embodiments of the invention are illustrated.

In the drawings:

FIGURE 1 is a front elevation of an assembled kit constructed in accordance with this invention and placed in closed position for carrying by hand;

FIG. 2 is a side elevation taken from the right side of the assembled kit of FIG. 1;

FIG. 3 is a top plan view of the kit of FIGS. 1 and 2, the flexible elastic loop at the left side being omitted, and the flexible elastic loop at the right side being swung out away from engagement with the hooked extremity of the respective carrier member;

Figure 10:
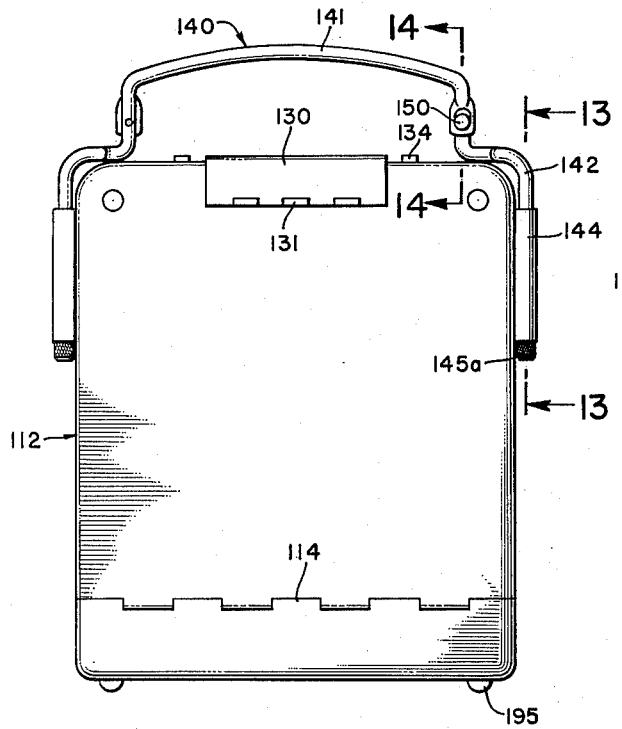
Figure 11:
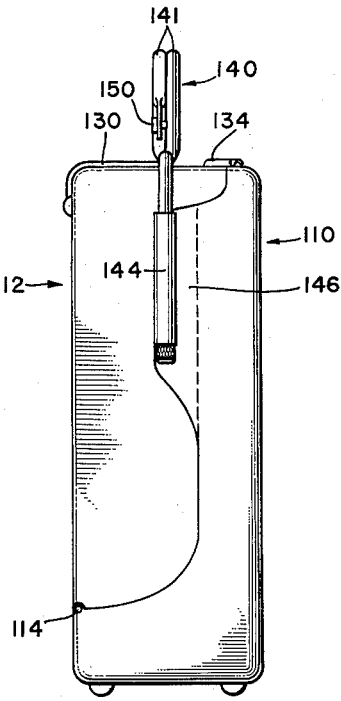
Figure 12:
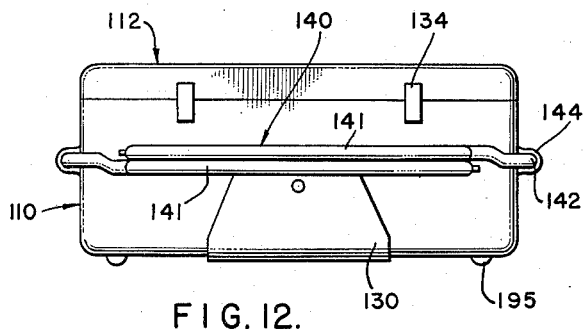
Figure 13:
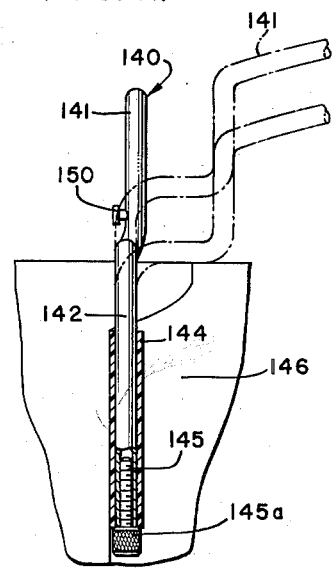
Figure 14:
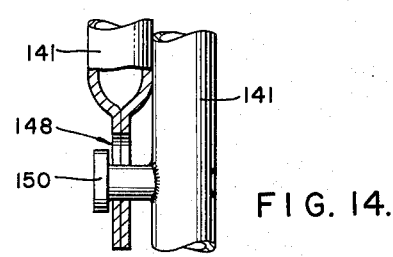

FIG. 4 is a perspective view showing the kit assembly of FIGS. 1, 2 and 3 mounted upon the back of an automobile seat with the forward lid or tray member swung downward into horizontal operative position, the slidable carrier members being swung around to positions substantially at right angles to the carrying position of FIG. 3 and engaged over the back of an automobile seat, the hooked extremities of the carrier means being inter-engaged, the better to maintain the supporting relationship;

FIG. 5 is a cross-section taken from the line 5—5 of FIG. 4 and illustrating additionally a modification of retainer means on the horizontal tray, as well as indicating in phantom the location of beverage cups, when in use;

FIG. 6 illustrates the position of the kit of FIGS. 1 and 4 when used upon the earth's surface for picnicking purposes;

FIG. 7 is a vertical fragmentary view illustrating the use of an auxiliary support for the tray;

FIG. 8 illustrates a modified form of mounting the hook-shaped carrier means;

FIG. 9 is an exploded perspective view of a modification having a fabric body and tray containing removable rigid plastic inserts;

FIGS. 10, 11 and 12 are respectively front and side elevations and a top plan view of a variation of the form of FIGS. 1, 2 and 3; and FIGS. 13 and 14 are fragmentary sectional elevations on the lines 13—13 and 14—14 of FIG. 10.

In the drawings, there is illustrated in FIGURES 1 to 7 a presently preferred embodiment of a camping or picnicking kit of this invention. Here, this pack outfit or kit assembly includes an upstanding kit or case body member 10 of relatively rigid plastic material, to a lower forward portion of which a lid or tray member 12 of similar rigid material is hinged at 14 so that the tray member 12 may be swung down into the operative horizontal position illustrated in FIGS. 4 and 6.

These kit members 10 and 12 may be molded in any known fashion from any of the common rigid or slightly yieldable moldable thermosetting plastics, or other suitable plastics, such as polystyrene plastics, polyethylene plastics, various phenolic plastics, and equivalent vinyl, acrylic and similar well-known plastic compounds.

The back wall 15 of the kit body 10 is conventionally provided with spring ring clamps 16 to receive and position conventional thermos bottles shown in phantom and indicated at T, and the outer main wall 18 of the tray or lid 12 is provided with upstanding walls 19 which may serve as a sandwich rack and for other retention purposes. As illustrated in FIG. 5, the outer members of this group which are indicated at 20 may stand much higher than the designated member 19 and thus serves not only as a retainer for sandwiches or the like, but also to receive in position, when the door or tray 12 is closed, a lunch box which will thus be disposed between the thermos bottles T. To avoid confusion, such a lunch box is not indicated. The wall 18 of the tray 12 is also illustrated as being provided with integral centering rings 21 for beverage cups shown in phantom in FIG. 5, which cups may be the caps of the thermos bottles T.

With the illustrated construction, as probably best seen in FIGS. 4, 5 and 6, the tray 12 includes, besides the main outer wall 18, outer side walls 22 and a top wall 23. In order that this tray may, when in operative position shown in FIGS. 4, 5 and 6, act to retain spilled liquids or the like, it is desirably further provided with a shallow, upstanding inner flange or wall 24 which is sufficiently narrow or shallow so that, when the tray is closed, it will reach no farther inward into the body member 10 than the adjacent side portions of the thermos bottles T. The same liquid retaining function is performed by a lower forward flange portion 25 of the body member 10 below the hinge 14.

Especially as seen in FIGURE 4, when the tray 12 is lowered into its horizontal operating position, the forward edge thereof rests upon the forward portion of the automobile seat S which is inclined upward and rearward. However, when the kit is to be employed on a flat or level surface such as the lawn or other surface indicated at L, it is desirable to have an elevating rest 30 which is L-shaped and is hinged at 31 to an outer portion of the main outer wall 18 so as to fold around the right angled edge of the tray 12 into the position shown in FIGS. 1 to 4 inclusive, where it may be retained, when not in use, through the medium of any snap fastening arrangement such as indicated at 33. For this rigid type of kit construction the lid or tray 12 is adapted to be retained in the closed position of FIGS. 1 to 3 by means of two part fasteners 34 often referred to as suitcase fasteners or clamps.

One of the outstanding features of this improvement resides in the means here disclosed for carrying and supporting the kit in the vertical positions of FIGS. 4 and 6 and for carrying the kit by hand as indicated in FIGS. 1, 2 and 3. The structural features of this aspect of the invention include a pair of suspension members or carriers 40 whose upper portions 41 are arcuate or hooked shaped and whose intermediate portions 42 are vertically disposed straight shank members that are received in vertical sleeves or channel members 44 that are desirably molded integrally with the kit body member 10 and serve as vertical guides for the shank members 42 and also for reduced extensions 45 adapted to be extended below the channelled guides or sleeves 44 as best indicated in FIG. 6. In the form shown, the guide sleeves 44 are formed on the vertical sidewalls 46 of the kit body member 10.

The guide sleeves or channels 44 serve to guide and position the carrier members 40 in any of the positions illustrated, that is between the supported position of the assembled kit over a seat-back B as seen in FIG. 4, or a hiker's shoulders, or in a depressed ground-penetrating position as seen in FIG. 6, or in the intermediate crossed carrying position indicated in FIGS. 1, 2 and 3. Each positioning sleeve 44 terminates at its upper end at such a location as to permit the carrier member 40 to be depressed to the earth-penetrating position of FIG. 6. Its lower end terminates in the vicinity of the bottom of the kit body member 10, and it is long enough to serve as adequate guide and positioning means for its carrier member 40. The swinging extremities of the carrier member 40 are provided with upturned hooks 48 which are sufficiently flared for one hook member 48, or an adjacent portion thereof, to engage into the other hook member for better anchoring of the arcuate portions 41 over a seat back or over a hiker's shoulders. It is also desirable to provide an endless elastic loop 50 seen in FIG. 6 which may be engaged in both of the hooks 48 to draw the hooks 48 toward each other in the case of a seat back which is unusually deep or in the case of an unusually large hiker. Another important function of the hooks 48 is illustrated especially in FIGS. 1 and 2 where they serve the function of anchoring the swinging ends of the carrier members 40 so as to provide the carrying handles illustrated in FIGURES 1 and 2. For this purpose the upper end of the side walls 22 of the tray 12 are equipped with elastic loops 52 whose ends are secured at 54 to the indicated upper portions of the side walls 22 through any appropriate clamp means such as indicated, which may include also rivets 55. In practice, the carrier members 40 are formed of shaped plastic rods which have a sufficient amount of resilience to permit the arcuate portions 41 thereof to be crossed over one another and to yield sufficiently for such crossing. The portions 41 must assume the position best illustrated in FIG. 3 so that the crossing portions constitute a handle to carry the closed assembly. One or both of the loops 52 may also yield to provide for proper positioning.

The reduced lower portion 45 of each carrier member 40 is preferably formed from steel rod of much smaller diameter than that of the plastic rod of which the carrier members 40 are formed. The upper end of the steel rod 45 in each instance may be threaded and screwed up into an internally threaded seat in the lower end of the respective rod shank 42, or it may be cemented therein or otherwise anchored. Desirably the lower end of the rod 45 is shaped in the form of a spike 56 which easily penetrates the earth for movement into the position indicated in FIG. 6. For easy return of the spike into the guide sleeve 44, the lower portion of the latter may be outwardly flared, as indicated at 57. In order that the carrier members 40 may not be withdrawn from the positioning channels or guide tubes 44 when the kit is to be suspended from a seat back B as indicated in FIG. 4, a stop pin 60 is anchored in each tube 44 on one or both sides of the reduced stem 45. Thus, such stop pin 60 serves to limit the upward movement of the flared spike 56 by reason of engagement of the latter with the stop pin 60, and also serves to limit the downward movement of the shank 42 by reason of the engagement of the lower end thereof with the stop pin 60. The guide sleeves or channels 44 are of adequate length to provide for these movements and accomplish the desired functions. Thus, if the penetration into the earth of the spike or point 56 of a carrier 40 is to be one unit of length, the stop pin 60 may be disposed about one unit of length above the lower end of the sleeve 44. As a result, when the respective carrier 40 is hooked into its carrying loop 52, its spike 56 is located about flush with the bottom of the body member 10, as seen in FIG. 2. When the carrier 40 is elevated to hook over the seat back B, as in FIG. 4, its upward movement is limited by the stop pin 60, and yet about one unit of length of the shank 42 remains in the sleeve 44 to be positioned thereby, even though the top of the sleeve 44, which may have a total of four of said units of length, terminates about a unit, or two units, below the top of the body member 10. The shank 42 will have a neat sliding fit in its sleeve or channel 44.

For placing upon any surface, contact domes or feet 95 may be employed.

In instances wherein the present improvement is intended to be used only for back packing or for hanging over the backs of automobile seats or the like, the carrier members 40 need not have the extent of movement required for the constructions of FIGS. 1 to 6, but may have only a limited amount of vertical movement and such swinging movement as necessary to permit them to move between the positions of FIG. 3 and FIG. 4. For this purpose, each shank 42 may be relatively short as indicated at 62 in FIG. 8 and each sleeve 44 may also be relatively short as indicated at 64 in FIG. 8. The carriers 40 otherwise will include the horizontally positioned arcuate members 41 and the terminal hooks 43. To provide for such vertical movement and swinging movement as is required for the indicated purposes, a coil spring 65 is employed, whose lower end is anchored in the bottom of each guide sleeve or channel member 64 as indicated at 66 and whose upper end is rigidly secured to the lower end of the shank 62 as indicated at 68. With this construction, the shank 62 may be drawn up somewhat against the tension of the spring 65 if required to hook the arcuate portion 41 over the back of the seat or over a hiker's shoulder. The spring 65 also will permit the hooked extremity 43 to be swung out from the carrying position of FIGS. 1 to 3 into the operating position of FIG. 6. When released from such operating position, the spring 65 will return the respective carrier 40 to the initial carrying position of FIG. 3.

In those instances where it is desirable to form the outer portion of the kit of a heavy fabric rather than of molded plastic members as in the form of FIGS. 1 to 6, a vertical body member 70 may be used which is formed of fabric and a tray member 72 also formed of fabric, there being a fabric connection between the two members 70 and 72 which constitutes the necessary hinge construction. To close the kit, the edges will be provided with the typical interlockable slide fastener members indicated at 74 which are interlocked by the conventional slide or runner 75 of the usual so-called zipper fastener. The carrier members 40 will be substantially the same carrier members as illustrated in FIGS. 1 to 6, but the guide sleeve members 76 will ordinarily be of fabric suitably stitched or otherwise secured to the vertical body member 70. With this type of construction, it is desired also to employ molded plastic inserts 80 and 82 respectively for reception by the members 70 and 72 and these inserts which are relatively rigid will be retained in place through the medium of any appropriate type of snap fastener indicated at 83. Here, the member 80 will carry the same rings 16a for the thermos bottles as provided in the structure of FIGS. 1 to 6, and all of the same upstanding and outstanding flanges will be used, such as the small inner shell flange 84 corresponding with the flange 24 and the upstanding flange 85 corresponding with the flange 25 of the body member 10. Integral cup retainers may also be employed such as indicated at 86, and the same may be true of upstanding sandwich retainers or lunch box retainers 90.

When it is desired to use the kit or pack above described, the hooks 43 of the carriers 40 are detached from the resilient flexible loops 52 so that the hook-like laterally extending portions 41 may be swung into the position of FIG. 4 or the position of FIG. 6. If the device is to be hung over the back of an automobile seat, as indicated in FIG. 4, the carriers 40, when suspending the kit, will move upward in the guide sleeves or channels 44 until the spikes or points 56 of the carriers 40 strike the stop pins 60, thus limiting the upward movement. In this position the lid or tray member 12 may be swung down into the horizontal operative position for supporting food or beverage receptacles somewhat as indicated, the clamps 34 being separated for the purpose.

If the kit is to be used on a lawn or other flat earth surface, the carriers will be forced downward until the spikes or points 56 are forced into the earth, whereby to steady the body member 10 in the upright position illustrated in FIG. 6. In this instance, in order to support the tray member 12 in a horizontal position, the rest 30 will be disconnected at the snap fastener 33 and swung down into the supporting position illustrated in FIG. 6.

If the outfit is intended to be used as a back pack for a hiker, the carriers 40 are easily hooked over the hiker's shoulders in the same relationship as that indicated in FIG. 4 or in the relationship indicated at the right of FIG. 9. In either event, the carrier members 40 will be elevated until the spikes 56 strike the stop pins 60.

With a pack of either the construction of FIGS. 1 to 7, or the construction of FIG. 9, the rigid body structure including the body member 10 and the tray 12 of FIGS. 1 to 7, or the structure containing the rigid inserts 80 and 82 of FIG. 9, yields a convenient relatively rigid picknicking structure, and in both of these forms the plastic members provide liquid retaining parts in the event that the beverage liquid of the thermos bottles or other beverage liquid is spilled.

In FIGS. 10 to 14 there is illustrated a variation of the form shown in FIGS. 1 to 7. Here, the same body member 110 and lid or tray member 112, hinged together at 114, are employed. The principal difference resides in the mounting and connection of the handle or carrier members 140, each of which has an upper arcuate or hook-shaped portion 141. Each carrier member 140 also has an offset downwardly extending shank portion 142 which is received in a guide sleeve or channel 144 integral with the respective side of the body member 110. These sides are extended forward in the form of overlapping guide wings 146 integral with the body member 110 and carry the integral sleeves or channels 144.

While the body member 110 and the tray member 112 are preferably formed of plastic material like that of the form of FIG. 1, the carrier members 140 are, however, preferably formed of metal tubing, such as stainless steel tubing, and the lower end portions of the shanks 142 are internally threaded, as indicated in FIG. 13 to receive long bolts 145 extending upward into such threaded portions. Each bolt 145 has a protruding knurled head 145a on its lower end which engages under the lower end of the respective sleeve 144 to retain the handle or carrier members 140 and their shanks 142. By adjusting the screw 145 through its knurled head 145a in each instance, upward extension of each carrier member 140 may be regulated for the purpose of accommodating the device to various heights of automobile seat backs, or to an individual hiker when necessary.

As in the form of FIG. 1, the members 140 are adapted to be swung from their closed position of FIGS. 10, 11 and 12, and from the full-line position of the single such member shown in FIG. 13, to a seat back engaging position such as indicated in broken lines in FIG. 13. For a low seat back, the lower broken line position is representative, and for a higher seat back the higher broken line position is representative.

For the purpose of disposing the arcuate portions 141 of the handle members 140 across the top of the kit in carrying position, the configuration of the members 140 is such as to permit them to assume the positions illustrated in FIGS. 10, 11 and 12. The members 141 are retained in such transverse position, and in contact with each other, through detent means probably best illustrated in the detail of FIG. 14. Here, the outer depending end of the portion 141 of each member 140 is flattened and provided with a catch hole or aperture 148, and this receives the outer end of a headed stud 150 disposed on the adjacent side of the other or opposing member 141. The head of the stud 150 thus serves as a latch to retain these handle parts together in the operative relation illustrated in FIGS. 10, 11 and 14. Since the members 140 are produced of metal tubing which has at least limited yieldability, connections and disconnections between each hole 148 and the respective headed stud 150 are easily accomplished.

Since the body member 110 and the lid or tray member 112 of this form are substantially the same as the corresponding parts of the form of FIGS. 1 to 7, this form may also be provided with a similar rest 130 hinged at 131 to the tray member 112, and with suitcase latches 134 and surface engaging buttons 195 and the like.

By these means a convenient and durable kit for Thermos bottles and food items is provided which is easy to wash and keep in condition ready for further use.

From the foregoing, various modifications of the present invention will occur to those skilled in the art, and it

The invention claimed is:

1. A carrying kit assembly including:
   a kit body adapted to stand upright and providing a chamber to receive containers;
   a tray member swingingly attached to said body adjacent its bottom for swinging outward into horizontal position to receive articles and upward to vertical position to close said chamber;
   vertical guide means at the sides of said upright kit body;
   and elongated carrier means movable in said guide means and having upper laterally extending means to engage over a support to suspend said assembly and to be positioned across the top of said assembly to provide handle means, said carrier means having lower spike portions for insertion into the earth to retain said kit body in vertical position.

2. An assembly as in claim 1 wherein outer portions of said laterally extending means and upper portions of said assembly are provided with cooperating engaging means for attaching said outer portions to asid assembly.

3. A carrying kit including:
   a kit body adapted to stand upright and providing a chamber to receive articles;
   a tray member swingingly attached to said kit body along a transverse lower portion thereof to swing outward into horizontal position and to swing upward to closed position;
   means to retain said tray in closed position;
   vertical guide means carried by end portions of said kit body;
   elongated carrier members vertically slidably carried in said guide means and having laterally extending portions to swing between carrying positions alongside each other over said kit body and extended positions to engage over a support; and
   depending earth-penetrating shank members carried by said carrier members, each carrier member and its shank member being vertically movable together between depressed earth penetrating position and elevated carrying position.

4. A kit as in claim 3 wherein said tray has upstanding peripheral flanges for retaining spilled liquids.

5. A kit as in claim 3 wherein the hinged portion of said tray is an inward lower edge portion hinged to said kit body above the bottom of said body, and an outward portion of said tray carries a rest to hold the tray in horizontal position spaced above the earth.

References Cited in the file of this patent
UNITED STATES PATENTS

| | | |
|---|---|---|
| 836,555 | Birnie | Nov. 20, 1906 |
| 1,615,611 | Bindon | Jan. 25, 1927 |
| 2,441,345 | Brumbaker | May 11, 1948 |
| 2,540,392 | Haskell | Feb. 6, 1951 |
| 2,615,541 | Whitesel | Oct. 28, 1952 |
| 2,645,392 | Gottsegen et al. | July 14, 1953 |